US011984998B2

(12) United States Patent
Agrawal et al.

(10) Patent No.: US 11,984,998 B2
(45) Date of Patent: May 14, 2024

(54) SELECTIVE VIDEO CONFERENCE SEGMENTATION

(71) Applicant: Motorola Mobility LLC, Chicago, IL (US)

(72) Inventors: Amit Kumar Agrawal, Bangalore (IN); Jeffrey S. Vanhoof, Gurnee, IL (US); Bill Ryan, Libertyville, IL (US); Daniel M. Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/826,427

(22) Filed: May 27, 2022

(65) Prior Publication Data

US 2023/0388139 A1 Nov. 30, 2023

(51) Int. Cl.
*H04L 12/18* (2006.01)
*G06V 10/25* (2022.01)
*G06V 20/40* (2022.01)
*G06V 40/16* (2022.01)

(52) U.S. Cl.
CPC .......... *H04L 12/1818* (2013.01); *G06V 10/25* (2022.01); *G06V 20/41* (2022.01); *G06V 20/49* (2022.01); *G06V 40/176* (2022.01)

(58) Field of Classification Search
CPC .... H04L 12/1818; G06V 10/25; G06V 20/49; G06V 20/41; G06V 40/176
See application file for complete search history.

(56) References Cited

U.S. PATENT DOCUMENTS

| 6,937,730 B1 * | 8/2005 | Buxton .............. H04N 21/4627 348/E7.071 |
| 9,571,789 B2 | 2/2017 | Pinter et al. |
| 10,079,995 B1 | 9/2018 | Ahnoff et al. |
| 10,931,676 B2 * | 2/2021 | Pantazelos ............. H04N 7/155 |
| 11,082,467 B1 | 8/2021 | Hartnett et al. |
| 11,507,342 B1 | 11/2022 | Agrawal et al. |
| 11,889,221 B2 | 1/2024 | Agrawal et al. |

(Continued)

FOREIGN PATENT DOCUMENTS

EP 3902202 A1 10/2021

OTHER PUBLICATIONS

"#YouWantItYouGotIt", YouTube Video uploaded by Motorola [online] [retrieved Mar. 30, 2022]. Retrieved from the Internet <https://www.youtube.com/watch?v=1SQ9yHe-TGo>., Mar. 25, 2021, 6 Pages.

(Continued)

*Primary Examiner* — Nazia Naoreen
(74) *Attorney, Agent, or Firm* — FIG. 1 Patents

(57) ABSTRACT

Techniques for selective video conference segmentation are described and are implementable in a video conference setting. The described implementations enable control over segments of video content that are viewable by a given participant in a video conference. For instance, segments of video content are generated that represent spatial portions of video content captured by a host device. The segments can be configured in a variety of ways for inclusion in one or more video streams. The video streams can be communicated to different participants within the video conference, for instance based on a status of a given participant, thus providing different fields of view to different participants.

20 Claims, 13 Drawing Sheets

(56) References Cited

U.S. PATENT DOCUMENTS

| | | | | |
|---|---|---|---|---|
| 2004/0193910 | A1* | 9/2004 | Moles | G06F 21/84 |
| | | | | 713/193 |
| 2006/0223520 | A1 | 10/2006 | Aroia et al. | |
| 2009/0147958 | A1* | 6/2009 | Calcaterra | H04L 9/0833 |
| | | | | 380/260 |
| 2018/0160076 | A1 | 6/2018 | Ozaki | |
| 2021/0051294 | A1* | 2/2021 | Roedel | G06F 21/6245 |
| 2021/0111916 | A1 | 4/2021 | Velayuntham et al. | |
| 2021/0350136 | A1* | 11/2021 | Sheng | H04N 21/812 |
| 2022/0046068 | A1 | 2/2022 | Ivov et al. | |
| 2022/0070385 | A1 | 3/2022 | Van Os et al. | |
| 2022/0206581 | A1 | 6/2022 | Powell et al. | |
| 2023/0036861 | A1 | 2/2023 | Lum | |
| 2023/0388443 | A1 | 11/2023 | Agrawal et al. | |

OTHER PUBLICATIONS

"New Ready for platform unleashes the power of moto g100", Motorola Blog [retrieved Mar. 30, 2022]. Retrieved from the Internet <https://www.motorola.com/blog/post?id=253>., Mar. 25, 2021, 5 Pages.

"Spark AR Studio", Spark AR Website, Facebook, Inc. [retrieved Mar. 30, 2022]. Retrieved from the Internet <https://sparkar.facebook.com/ar-studio/>., 2019, 8 pages.

"Tips on using Zoom with a Sign Language Interpreter", Deaf Unity [retrieved Mar. 30, 2022]. Retrieved from the Internet <https://deafunity.org/article_interview/tips-on-using-zoom-with-a-sign-language-interpreter/>., Aug. 1, 2020, 13 Pages.

Adorno, José , "Roundup: Here's how the 2021 iPad Pro Center Stage feature really works", 9to5mac [retrieved Mar. 30, 2022]. Retrieved from the Internet <https://9to5mac.com/2021/05/19/roundup-heres-how-the-2021-ipad-pro-center-stage-feature-really-works/>., May 19, 2021, 22 Pages.

Russell, Brandon , "Galaxy S21 features wireless support for Samsung DeX on PC", XDA Developers Blog [online][retrieved Mar. 30, 2022]. Retrieved from the Internet <https://www.xda-developers.com/galaxy-s21-wireless-support-samsung-dex-on-pc/>., Feb. 5, 2021, 7 pages.

U.S. Appl. No. 17/826,502, "Non-Final Office Action", U.S. Appl. No. 17/826,502, dated Jun. 26, 2023, 17 pages.

U.S. Appl. No. 17/826,502, "Notice of Allowance", U.S. Appl. No. 17/826,502, dated Sep. 6, 2023, 5 pages.

U.S. Appl. No. 17/826,502, "Corrected Notice of Allowability", U.S. Appl. No. 17/826,502, Oct. 16, 2023, 3 pages.

U.S. Appl. No. 17/826,502, "Corrected Notice of Allowability", U.S. Appl. No. 17/826,502, Nov. 13, 2023, 3 pages.

U.S. Appl. No. 17/826,502, "Corrected Notice of Allowability", U.S. Appl. No. 17/826,502, Dec. 28, 2023, 3 pages.

* cited by examiner

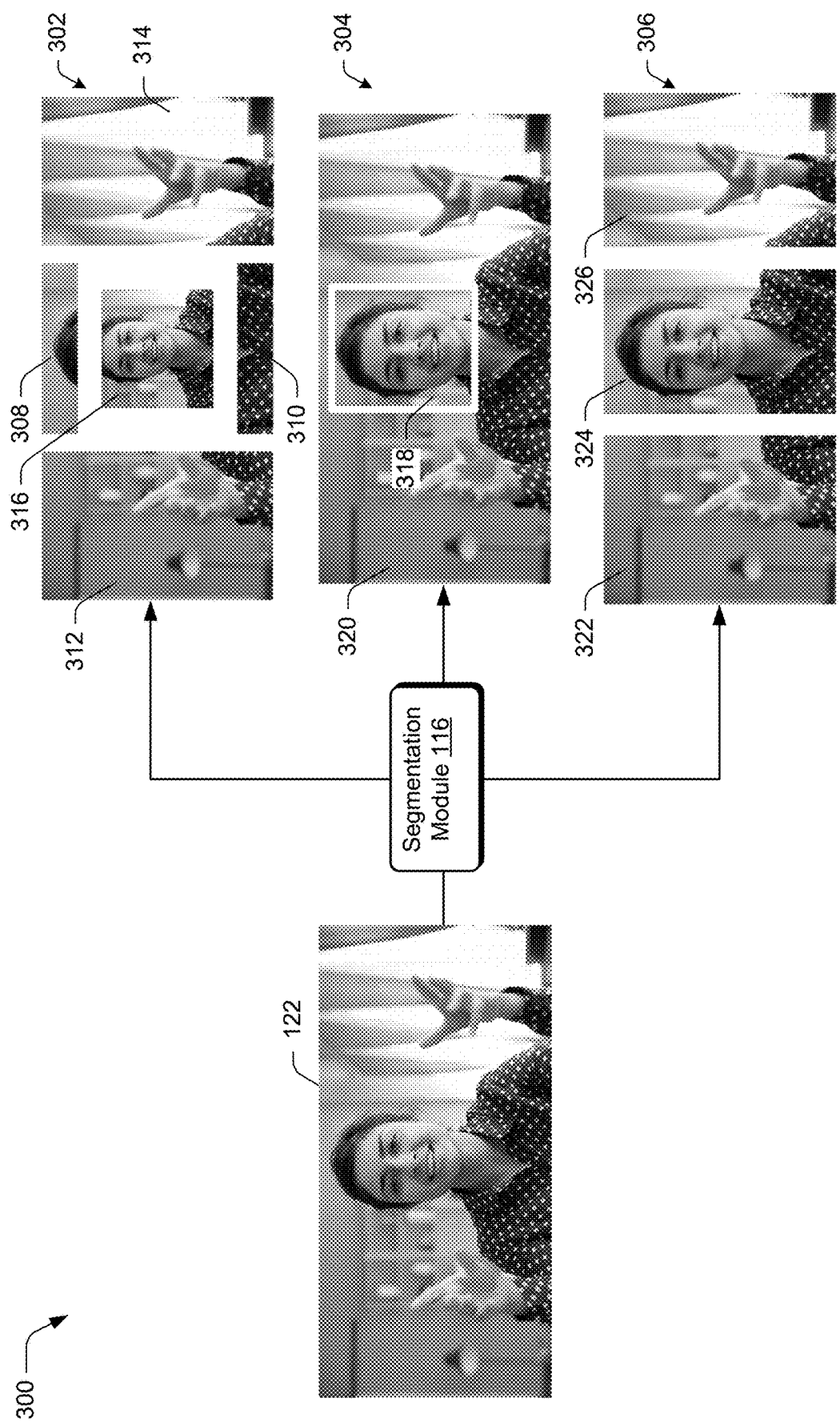

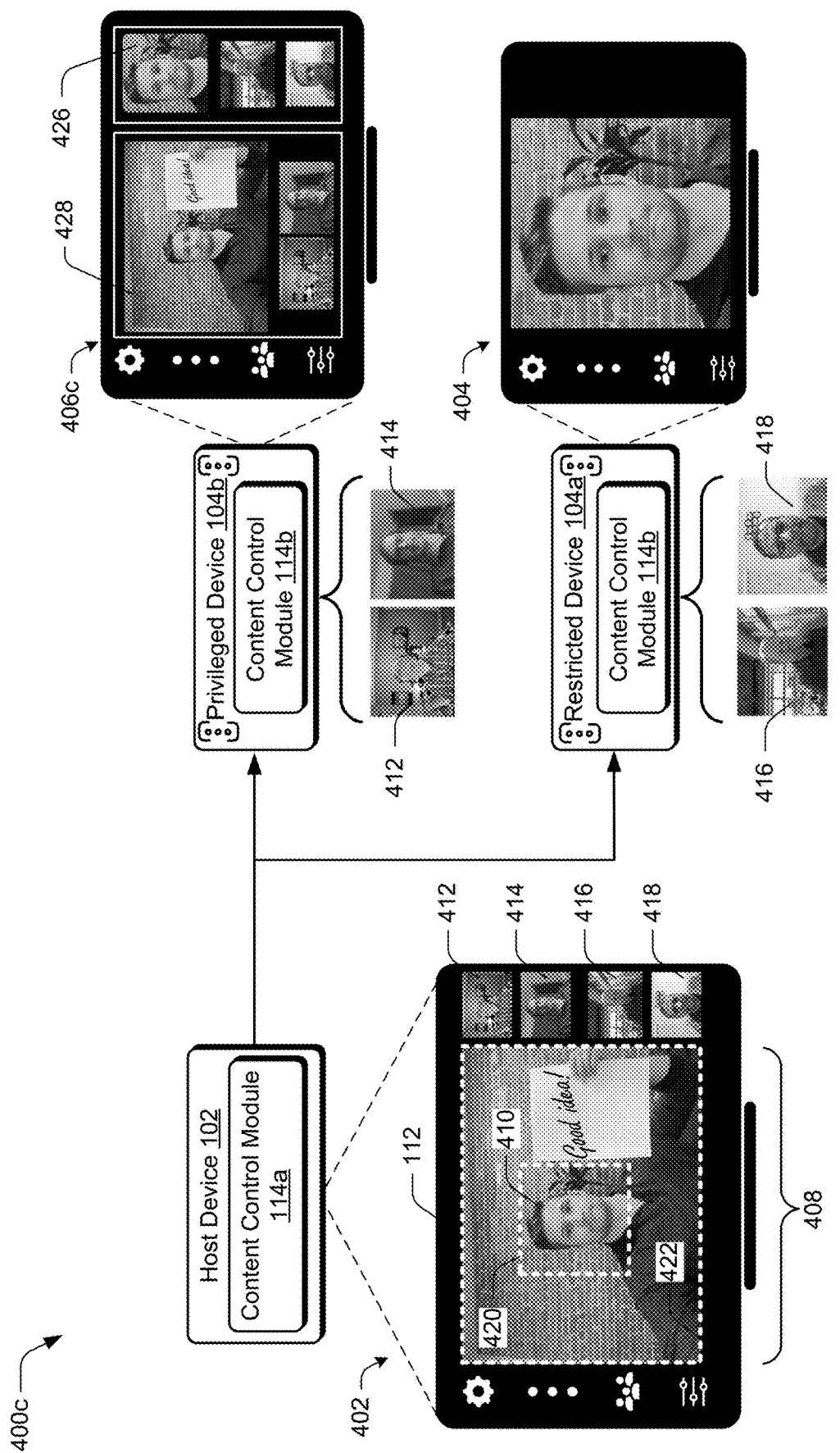

SELECTIVE VIDEO CONFERENCE SEGMENTATION

BACKGROUND

The modern work model is in the midst of a paradigm shift from the traditional in-person setting to working from home or remotely. As such, in today's intercommunication context, video conferences and events which include remote participants who are connected virtually have become commonplace. Video conferences remove the traditional confines associated with in-person meetings and increase flexibility by allowing participants who would otherwise be unable or unwilling to attend in-person to be present. However, current ways for enabling individual communication within a video conferencing setting are limited and can reduce flexibility and offset the benefits associated with video conferences.

BRIEF DESCRIPTION OF THE DRAWINGS

Aspects of selective video conference segmentation are described with reference to the following Figures. The same numbers may be used throughout to reference similar features and components that are shown in the Figures:

FIG. 3 depicts an example implementation for selective video conference segmentation depicting various types of segmentation styles in accordance with one or more implementations;

FIG. 4c depicts an example implementation for selective video conference segmentation in which the first video stream includes supplemental content in accordance with one or more implementations;

DETAILED DESCRIPTION

Figure 1:
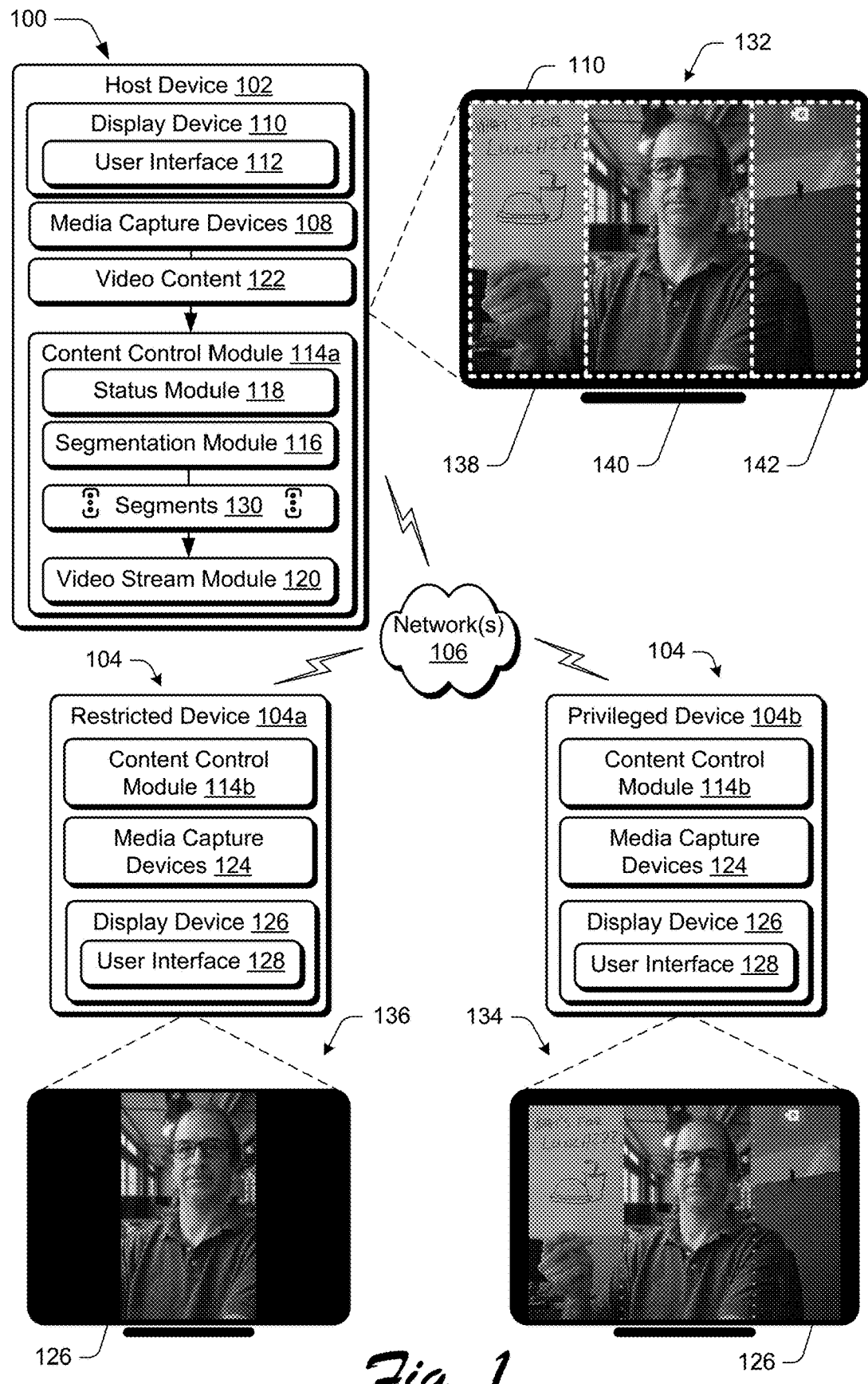
FIG. 1 illustrates an example environment in which aspects of selective video conference segmentation can be implemented.

Techniques for selective video conference segmentation are described and may be implemented in a virtual conference setting to generate video streams including different segments of video content and communicate different video streams to various participants in the virtual conference. The described implementations, for instance, enable a user to control segments of video content that are viewable by a given participant.

According to various implementations, a first computing device, e.g., a host device, is communicatively coupled with at least one second computing device, e.g., one or more participant devices, to enable video conferencing. The first and second devices are able to communicate audio and visual data in real time, such as through a video conferencing application. Accordingly, the first and second devices include media capture devices such as cameras and audio capture devices, as well as display devices such as display screens. In an example, the first device is a host device and includes a content control module configured to process video content, e.g., as captured by a camera of the host device.

The host device is operable to generate segments of the video content with the segments representing different spatial portions of the video content. In some implementations, this segmentation is responsive to an input trigger detected by the host device, such as a user gesture (e.g., a hand gesture), user input, and/or features identified using artificial intelligence scene detection modalities. In one or more examples, the segments are generated using facial detection and/or object recognition techniques. The video content can be segmented in a variety of styles, for instance a left/right/center segmentation, a face centered segmentation, top/bottom/right/left/center segmentation, etc. In some examples, the segments include a variety of visual content, for instance supplemental images and/or videos, screen shared content, text inputs, drawn representations, etc. The segments are also able to support a variety of functionality, for instance gesture-based effects, touch-based drawings such as a "whiteboard" feature, etc.

The host device is further configured to generate video streams with various combinations and configurations of segments. For instance, in an example the video content is segmented into three segments, e.g., a left, right, and center segment. The host device is thus operable to generate a video stream including one of the segments, two of the segments, or three segments in a variety of configurations. In some examples, the host device is employed to determine a status of one or more participant devices and the configuration of segments included in the video stream is based on the determined status. The status indicates, for instance, the viewership permissions of the one or more participant devices and can be based on a permission setting, an organizational classification, user defined permissions, etc.

In some implementations, the host device generates multiple video streams with different configurations of segments. For instance, the host device generates a first video stream including a first set of segments and a second video stream including a second set of segments. The second set of segments, for example, includes at least one segment different from the first set of segments. In an example, the second video stream is a privileged video stream that includes at least one segment that is not included in the first set of segments. The first video stream is thus a restricted video stream and does not include at least one of the segments, thereby depicting a focused or limited field of view of a scene captured by the video content. This is by way of example and not limitation, and a variety of configurations of segments included in the video streams can be generated in accordance with the disclosed implementations.

The host device is further configured to communicate one or more video streams to one or more participant devices e.g., to subsets of participant devices. Consider, for instance, that a user of the host device is the host of a video conference with several participants. In conventional scenarios, the video content captured by the first device is uniformly shared with the participants such that each participant views a same scene captured by the video content. Thus, the user in the conventional example is unable to communicate selective information to the participants. The techniques described herein, however, enable control over the segments that are viewable by a given participant or a subset of participants.

Continuing the example above with first and second video streams, the host device communicates the first video stream (e.g., the restricted video stream) to a first subset of participant devices and the second video stream (e.g., the privileged video stream) to a second subset of participant devices. In some examples, the video stream communicated to a particular participant is based on the status of the particular participant. In this example, the first subset of participant devices includes participants with a restricted status, and the second subset of participant devices include participants with a privileged status. Thus, the restricted participants are able to view the restricted video stream, which does not include at least one of the segments. The privileged participants are able to view the privileged video stream that includes at least one segment that is not included in the restricted video stream. In some examples, the subsets of participant devices are dynamic, and participants are movable from one subset to another throughout the course of the video conference. For instance, the status of a particular participant may change from restricted to privileged, and thus the particular participant can be recategorized (e.g., dynamically during the video conference) into the privileged subset and is thus able to view the privileged video stream.

While the above operations are described with respect to a host device, in additional or alternative implementations, the participant device includes a content control module and is thus operable to perform the same or similar operations and achieve the functionality described above. For instance, the participant device receives video content from the host device as part of the video conference session, e.g., as unaltered video content. The content control module is operable to determine a status of the participant device, e.g., based on a permission setting configurable by the participant device, organizational classifier, etc. The participant device is enabled to partition the video content into two or more segments representing spatial portions of the video content as described above.

The participant device can also generate a video stream including a configuration of one or more of the segments for display by the participant device. In some examples, the configuration of segments in the video stream is based on the status of the participant device. For instance, in an example in which the status of the participant device is unrestricted (e.g., privileged), the video stream includes two or more segments. In another example the status of the participant device is restricted, and the participant device restricts inclusion of one or more of the segments in the video stream, and thus prohibits display of such segments on a display device of the participant device.

Accordingly, the techniques described herein enable selective communication of visual content in a videoconference setting and facilitate a variety of functionality that is not conventionally available to a user.

While features and concepts of selective video conference segmentation can be implemented in any number of environments and/or configurations, aspects of selective video conference segmentation are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of selective video conference segmentation can be implemented. The environment 100 includes a host device 102 and participant devices 104, in this example depicted as a restricted device 104a and a privileged device 104b. The host device 102, the privileged device 104b, and the restricted device 104a are communicatively coupled via a wired or wireless connection, for instance via a network 106. The host device 102, the restricted device 104a, and the privileged device 104b can be implemented in a variety of different ways, such as a laptop computer, a desktop computer, a portable device that can be carried by a user (such as a smartphone or a tablet device), a docked mobile device connected to a monitor, and so forth. These examples are not to be construed as limiting, however, and the host device 102 and the participant devices 104 can be implemented in a variety of different ways and form factors. Example attributes of the host device 102 and the participant devices 104 are discussed below with reference to the device 1000 of FIG. 10.

The host device 102 includes various functionality that enables the host device 102 to perform different aspects of selective video conference segmentation discussed herein, including media capture devices 108, a display device 110 displaying a user interface 112, and a content control module 114a. The participant devices 104 also include a content control module 114b. While the functionality of the content control module 114a is primarily discussed with respect to the host device 102 in the following example, the same or similar functionality can be implemented by the content control module 114b of the participant devices 104. The content control module 114a is illustrated as including a segmentation module 116, a status module 118, and a video stream module 120.

The media capture devices 108 are representative of functionality to enable various types of media to be captured via the host device 102, such as visual media and audio media, e.g., video content 122. In one or more examples, the media capture devices 108 include audio capture devices, video capture devices such as cameras, and a variety of other devices that are able to capture various types of media in accordance with the implementations discussed herein. The media capture devices 108 include not only hardware for capturing associated media but also logic (e.g., drivers, firmware, etc.) for operating and configuring operation of the associated media capture devices 108. The display device 110 represents functionality (e.g., hardware and logic) for enabling video output via the host device 102.

The participant devices 104 such as the privileged device 104b and the restricted device 104a also include media capture devices 124, which are representative of functionality to enable various types of media to be captured via the participant devices 104, such as visual media and audio media. In this particular example, the media capture devices 124 include audio capture devices and video capture devices such as cameras. The media capture devices 124, however, can include a variety of other devices that are able to capture various types of media in accordance with the implementations discussed herein. The media capture devices 124 include not only hardware for capturing associated media but also logic (e.g., drivers, firmware, etc.) for operating and configuring operation of the associated media capture devices 124. The participant devices 104 also include a display device 126 displaying a user interface 128. The display device 126 represents functionality (e.g., hardware and logic) for enabling video output via the participant devices 104. In particular, the display device 126 is implemented to display a video stream in the user interface 128 generated by the content control module 114a and/or the content control module 114b.

The content control module 114a is implemented at least partially in hardware of the host device 102 to utilize the segmentation module 116 to generate one or more segments 130 of video content 122 captured by the media capture devices 108 and generate a video stream by the video stream module 120 to be communicated to one or more participant devices 104. In one or more examples, the status module 118 is operable to determine a status of a particular participant device 104 (e.g., whether a participant device 104 is a restricted device 104a or a privileged device 104b), and the configuration of segments 130 included in the video stream is based on the determined status. In some examples, the host device 102 is operable to generate more than one video stream, and communication of a particular video stream is based on the determined status. Alternatively or additionally, a content control module 114b is implemented at least partially in hardware of a participant device 104 to receive video content 122, e.g., from the host device 102, and partition the video content 122 into segments 130. The content control module 114b of the participant device 104 is further configured to generate a video stream for display by the participant device 104 including one or more of the segments 130. In some examples, the configuration of the segments 130 included in the video stream is based on a status of the participant device 104, e.g., as determined by the content control module 114b.

Example operations for selective video conference segmentation are shown in first stage 132, second stage 134, and third stage 136. In the example, the host device 102, the privileged device 104b, and the restricted device 104a are communicatively coupled for a video conference call. At first stage 132, the host device 102 captures video content 122 using one or more media capture devices 108. As illustrated, the video content 122 includes a representation of a person holding up a handwritten sign that reads "What's for lunch???"

As introduced above, the segmentation module 116 of the content control module 114a is operable to generate segments 130 of the video content 122. In this example, the segments 130 are delineated with dashed white lines to show a left segment 138, a center segment 140, and a right segment 142. The status module 118 is operable to determine the status of the participant devices 104, e.g., as the privileged device 104b and as the restricted device 104a. Based on the determined status, a video stream module 120 generates video streams for communication to the privileged device 104b and the restricted device 104a. As shown at second stage 134, the video stream communicated to the privileged device 104b includes the left segment 138, the center segment 140, and the right segment 142. Thus, the user interface 128 of the privileged device 104b depicts the full scene, such as the person as well as the sign. As shown at third stage 136, the video stream communicated to the restricted device 104a includes the center segment 140 and excludes the left segment 138 and the right segment 142, and thus depicts a focused but limited field of view of the scene captured by the video content 122.

While in this example the functionality of the content control module 114a is primarily discussed with respect to the host device 102, a content control module 114b of a participant device 104 is also capable of the same or similar functionality as well as additional features as further described below. For instance, the content control module 114b is operable to receive video content 122 from the host device 102, determine a status of the participant device 104, partition the video content 122 into segments 130, generate a video stream based on the determined status, and display the video stream, e.g., by a display device 126.

Having discussed an example environment in which the disclosed techniques can be performed, consider now some example scenarios and implementation details for implementing the disclosed techniques.

Figure 2A:
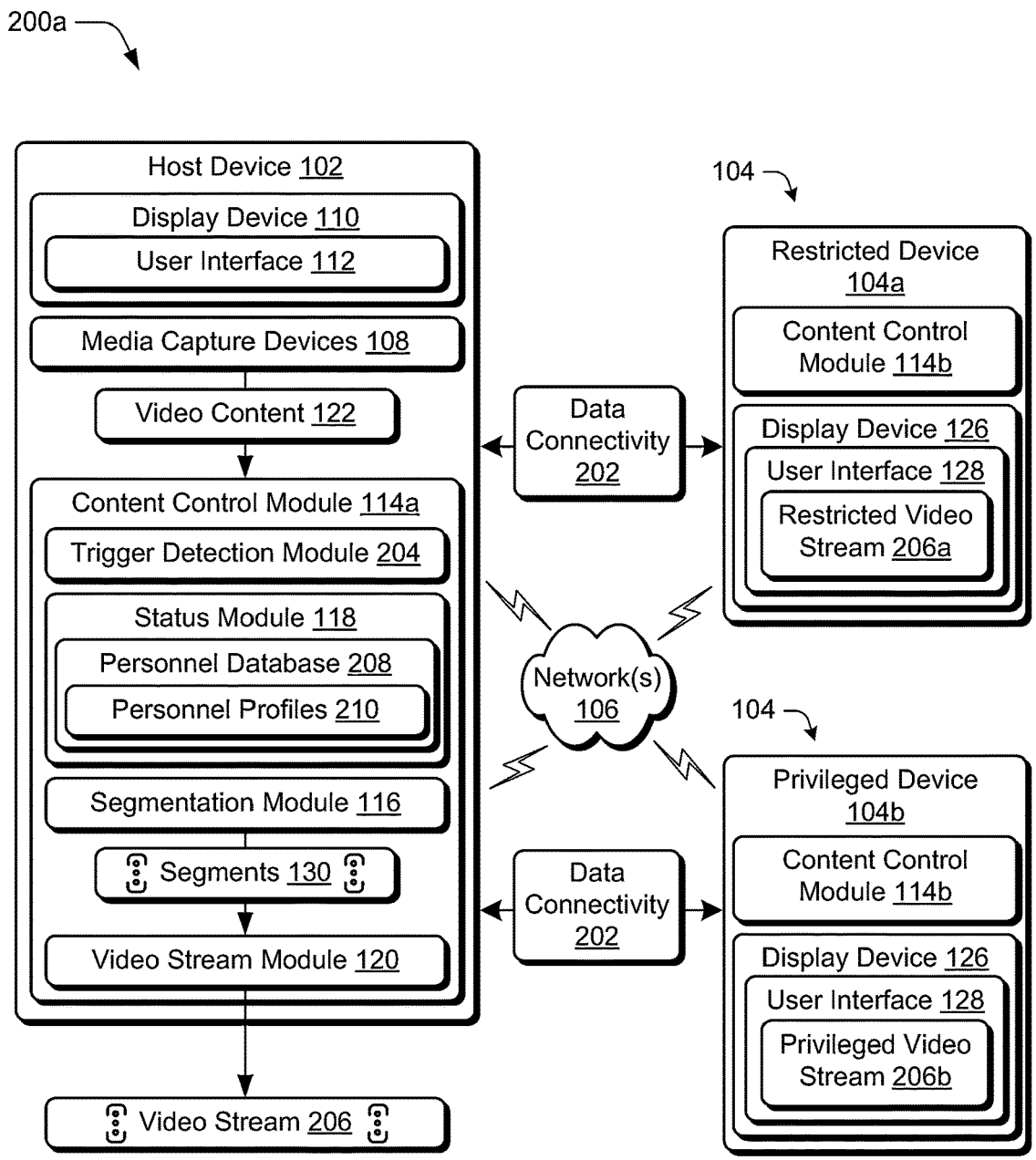
FIG. 2a depicts an example system for selective video conference segmentation in accordance with one or more implementations.

FIG. 2a depicts an example system 200a for selective video conference segmentation in accordance with one or more implementations. The system 200a can be implemented in the environment 100 and incorporates attributes of the environment 100 introduced above. In the example system 200a the host device 102 and one or more participant devices 104 interface to establish data connectivity 202. As depicted in this example, the participant devices 104 include the privileged device 104b and the restricted device 104a and thus data connectivity 202 is established between the host device 102, the privileged device 104b, and the restricted device 104a. In various implementations, there are multiple restricted devices 104a, e.g., as a first subset of participant devices 104, and/or multiple privileged devices 104b, e.g., as a second subset of participant devices 104.

The data connectivity 202 is implemented via wireless and/or wired connectivity between the host device 102 and the one or more participant devices 104 for exchanging data between the devices. The data connectivity 202, for instance, is implemented via direct wireless and/or wired connectivity between the host device 102, the privileged device 104b, and the restricted device 104a, and/or via data communication over the network 106 between the host device 102, the privileged device 104b, and the restricted device 104a. In a wireless scenario the data connectivity 202 can be established as direct device-to-device connectivity between one or more of the host device 102, the privileged device 104b, and the restricted device 104a utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

Further, the example system 200a shows operation of the content control module 114a, which is illustrated as including a trigger detection module 204, the segmentation module 116, the status module 118, and the video stream module 120. In an example, the host device 102, the privileged device 104b, and the restricted device 104a are communicatively coupled as part of a video conferencing application. The content control modules 114a, 114b, for example, are implemented by and/or in conjunction with a video conferencing application. Media capture devices 108 such as audio sensors and video capture devices including cameras are operable to capture video content 122 from an environment surrounding the host device 102. The video content 122, for instance, includes visual and audial attributes to depict a scene in the environment. In one or more examples, the media capture devices 108 include one or more wide or ultra-wide angle cameras.

The content control module 114a is configured to receive the video content 122, e.g., as captured by a camera of the host device 102. The segmentation module 116 is operable to generate one or more segments 130 of the video content 122, the segments 130 representing spatial portions of the video content 122. In some implementations, the segmentation is responsive to an input trigger, e.g., as detected by the trigger detection module 204. The trigger detection module 204 is operable to detect an input trigger, such as a user gesture, user input, or using artificial intelligence scene detection modalities. User gestures can include a motion or action of a user detected using gesture recognition functionality, such as a hand gesture, facial gesture, or other bodily movement. User gestures can control a variety of functionalities of the host device 102 or the participant device 104, in this example including functionality pertaining to generation of the segments 130.

For instance, the trigger detection module 204 detects a user of the host device 102 performing a user gesture of raising both hands off to the side at the same time, indicating to the segmentation module 116 to generate a left segment, center segment, and right segment. In one or more examples, the segments 130 are generated using facial recognition and/or object detection strategies. In an example, this includes generating a segment bordering the face of an individual, and/or an identified object represented in the video content 122. The segmentation module 116 is operable to generate segments 130 of the video content 122 in various styles, for instance a left/right/center segmentation, a face centered segmentation, top/bottom/right/left/center segmentation, etc. In some examples, the segments 130 include a variety of visual content and/or functionalities, for instance supplemental images and/or videos, screen shared content, text inputs, user gestures, and/or touch-based drawings such as a "whiteboard" feature as further described below.

In some implementations, the status module 118 is operable to determine a status of a participant or the one or more participant devices 104. The status indicates, for instance, the viewership permissions of the one or more participant devices 104. In various examples, one or more of the generation of the segments 130, the generation of a video stream 206, the configuration of the segments 130 in the video stream 206, and/or the communication of the video stream 206 to the participant device 104 are based on the determined status. The status can be based on a permission setting, an organizational classification, user defined, etc. In an example, the status module 118 includes a personnel database 208 including personnel profiles 210 that indicate a respective status for a particular participant in the video conference.

In various implementations, the determination of the status of the participant device 104 includes a determination whether a participant is a restricted participant or a privileged participant. Alternatively or additionally, there are a variety of status levels that correspond to different viewership rights for the participant device 104, e.g., a first tier, second tier, third tier, fourth tier etc. In an example, the segments 130 include a left segment, center segment, and a right segment. A first status tier corresponds to permission to view the central segment, a second status tier indicates permission to view the central segment and the right segment, a third status tier corresponds to permission to view the central segment and the left segment, and a fourth status tier indicates permission to view the left segment, central segment, and right segment.

The video stream module 120 is operable to receive the segments 130, and from the segments 130 generate one or more video streams 206 with various combinations and configurations of segments 130. For instance, in an example in which the video content 122 is segmented into three segments 130, e.g., left, right and center segments 130, the video stream module 120 is operable to generate a video stream 206 including one of the segments 130, two of the segments 130, or the three segments 130. The configuration of segments included in the video stream 206 can be based on a variety of factors, for instance based on a determined status, to reduce computational resource consumption, to optimize a video quality or experience by including significant spatial portions of the scene, etc. By way of example, the status of the participant device 104 corresponds to a number and/or position of segments 130 including in the configuration of segments 130. In another example, the configuration of segments 130 is based on optimizing a visual appearance of the video stream 206 based on the resolution capability of the display device 126.

In some implementations, the video stream module 120 generates multiple video streams 206 with different configurations of segments 130. For instance, the video stream module 120 generates a first video stream including a first set of segments 130 and a second video stream including a second set of segments 130 including at least one segment 130 different from the first set of segments. In the illustrated example, the first video stream is a restricted video stream 206a and does not include at least one of the segments 130, thereby depicting a limited view of a scene captured by the video content 122. The second video stream is a privileged video stream 206b that includes at least one segment 130 that is not included in the first set of segments, offering a more complete representation of the scene. This is by way of example and not limitation, and a variety of configurations of segments 130 included in the video streams 206 are contemplated.

The content control module 114a is further configured to communicate the one or more video streams 206 to one or more participant devices 104. In the illustrated example, this includes communication of the restricted video stream 206a to the restricted device 104a and the privileged video stream 206b to the privileged device 104b. Thus, the display device 126 of the restricted device 104a is able to display the restricted video stream 206a in the user interface 128. The display device 126 of the privileged device 104b is operable to output the privileged video stream 206b that includes at least one segment 130 that is not included in the restricted video stream 206a. Other examples include multiple restricted devices 104a, e.g., as a first subset of participant devices 104, and/or multiple privileged devices 104b, e.g., as a second subset of participant devices 104. In such examples, determination of the first and second subsets can be based on a determined status of the respective participant devices 104, e.g., as restricted or privileged, associated with a particular entity, etc.

In some examples, the one or more video streams 206 are further configurable with supplemental information and/or content. In the example above, for instance, the privileged video stream 206b is configurable to include one or more of a representation of the participant devices 104 included in the first subset, a representation of the participant devices 104 included in the second subset, as well as the restricted video stream 206a. The host device 102 is also operable to generate a visual representation for display by the host device 102, e.g., in the user interface 112 by the display device 110. The visual representation can include one or more of the video content 122, a representation of the participant devices 104 included in the first subset, a representation of the participant devices 104 included in the second subset, the restricted video stream 206a, and/or the privileged video stream 206b.

Figure 2B:
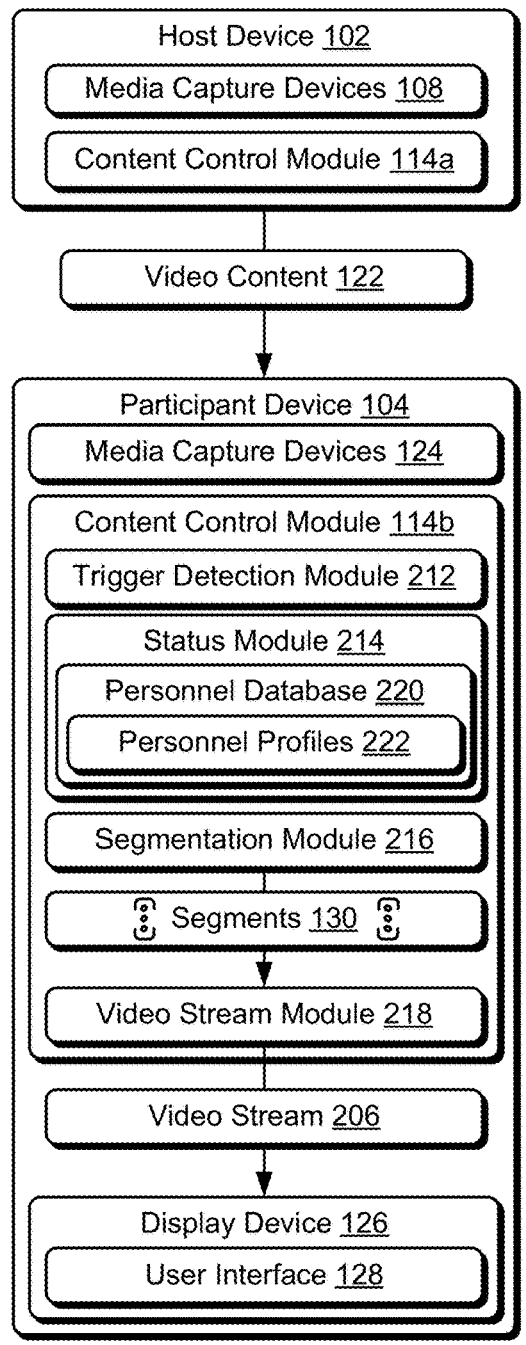
FIG. 2b depicts an example system for selective video conference segmentation further depicting operation of a content control module of a participant device in accordance with one or more implementations.

FIG. 2b depicts an example system 200b for selective video conference segmentation further depicting operation of a content control module 114b of a participant device 104 in accordance with one or more implementations. The system 200b, for instance, depicts a host device 102 communicatively coupled to the participant device 104, e.g., using the data connectivity 202 as described above with respect to FIG. 2a. The example system 200b shows operation of the content control module 114b, which is illustrated as including the media capture devices 124, a trigger detection module 212, a status module 214, a segmentation module 216, and a video stream module 218. The status module 214 is illustrated as including a personnel database 220 including personnel profiles 222.

The content control module 114b of a participant device 104 is capable of the same or similar functionality as described with respect to the content control module 114a of the host device 102. In the example system 200b, the media capture devices 108 of the host device 102 are employed to capture video content 122, e.g., depicting a scene. The participant device 104 is operable to receive the video content 122 as part of the video conference session, e.g., as unedited video content. In additional or alternative examples, the video content is received as video content 122 that has been pre-segmented, e.g., the video content 122 includes segments generated by the host device 102. In some implementations, the status module 214 is employed to determine a status of the participant device 104, e.g., based on a permission setting configurable by the participant device 104, organizational classifier, a status as defined by the host device 102, etc. The status, for instance, indicates the viewership permissions of a user of the participant device 104. In an example, the status module 214 includes a personnel database 220 including personnel profiles 222 that indicate a respective status for the participant device 104. In some implementations including multiple participants, the status module 214 of the participant device 104 is operable to determine statuses of the other participants, for instance based on the personnel profiles 222.

The segmentation module 216 is operable to generate segments 130 of the video content 122 in various ways as further described above with respect to the segmentation module 116, such as by partitioning the video content 122 into two or more segments 130. In examples in which the video content 122 is pre-segmented, the segmentation module 216 can be used to generate further segments 130, e.g., by further partitioning the video content 122 or the existing segments 130. In some examples, the segments 130 include a variety of visual content, for instance supplemental images and/or videos, screen shared content, text inputs, drawn representations, etc. The segments are also able to support a variety of functionality, for instance user gesture-based effects, touch-based drawings such as a "whiteboard" feature, etc. In an example, the generation of segments 130 is based on the determined status of the participant device 104. In some implementations, the segmentation is responsive to an input trigger, e.g., as detected by the trigger detection module 212. As described above an input trigger can include one or more of a user gesture, user input, and/or features identified using artificial intelligence scene detection modalities. For example, the trigger detection module 212 can detect features included in the video content 122 that initiate the segment generation, and/or to specify a segmentation style. This is by way of example and not limitation, and a variety of input triggers are considered.

The video stream module 218 is operable to generate a video stream 206 including a configuration of one or more of the segments 130 for display by the participant device 104, e.g., in the user interface 128 of the display device 126. In some examples, the video stream 206 and the configuration of segments 130 is based on the status of the participant device 104. For instance, in an example in which the status of the participant device 104 is unrestricted (e.g., a privileged device 104b), the video stream includes two or more segments 130. In another example the status of the participant device 104 is restricted (e.g., a restricted device 104a), and the participant device 104 restricts inclusion of one or more of the segments 130 in the video stream 206. Thus, the display of such segments 130 on the display device 126 of the participant device 104 is prohibited. In further examples, the number and/or position of the segments 130 included in the video stream 206 corresponds to the determined status. For instance, the determined status indicates how many segments 130 a participant device 104 is permitted to display and a designated configuration for the segments 130. In an example, the status indicates that the participant device 104 is permitted to display two segments 130 in a picture-in-picture position or configuration. In implementations in which the video content 122 received by the participant device 104 includes segments 130 generated by the host device 102, the participant device 104 is operable to include one or more of these segments 130 in the video stream 206.

Accordingly, the techniques described herein enable selective communication of visual content in a videoconference setting and facilitate a variety of functionality that is not conventionally available to a user.

FIG. 3 depicts an example implementation 300 for selective video conference segmentation depicting various types of segmentation styles in accordance with one or more implementations. In this example, shown in first stage 302, second stage 304, and third stage 306, the segmentation module 116 is employed to generate segments 130 from an instance of video content 122. Although not illustrated in this example, a segmentation module 216 of a participant device 104 is also able to generate segments 130 from the video content 122, for instance as described with respect to the segmentation module 116. A variety of segmentation configurations are contemplated, and the following example is not seen as limiting.

At first stage 302, the segmentation module 116 segments the video content 122 into five segments, for instance top segment 308, bottom segment 310, left segment 312, right segment 314, and central segment 316. In some implementations, one or more of the segments 130 include digital content such as supplemental images and/or videos, screen shared content, text inputs, etc. In various examples, one or more segments 130 support functional features such as user gesture recognition, touch-based drawing, and/or object-tracked representations such as a "whiteboard" feature, etc. For instance, the content control module 114a can detect user gestures depicted in one or more of the segments 130 to control a variety of functionality such as to apply a visual effect to the video stream 206 such as zoom, focus, blur, change background settings, etc. In another example, one or more segments 130 include a "whiteboard feature" in which a user is able to "draw" on a segment 130, such that a user-defined stroke overlays the video stream 206 as further described below with respect to FIG. 6. Thus, segments 308, 310, 312, 314, and 316 are configurable to include the above-described features and functionalities.

Second stage 304 depicts a central segment 318 surrounding a person's face and a larger rectangular segment 320 depicting the remainder of the scene. In some implementations, segments 130 are generated using facial recognition. In this particular example, the segmentation module 116 leverages facial recognition to generate a segment 318 and a segment 320. For instance, facial recognition is used to define a segment surrounding the face of the person depicted in the video content 122. In other implementations, the segmentation module 116 utilizes artificial intelligence and/or object recognition techniques to determine a region of interest, e.g., to generate a segment 130 surrounding the region of interest. Accordingly, the video stream module 120 is operable to generate video streams 206 that prohibit display of segments 130 that are not in a region of interest, thus preventing communication of "uninformative" portions of the video content 122, e.g., segments outside a region of interest.

At third stage 306, the segmentation module 116 generates three segments from the video content 122, for instance a left segment 322, center segment 324, and right segment 326. In some examples, the arrangement and number of segments 130 are predefined, e.g., by a user. Alternatively or additionally, the segments 130 are generated automatically. In some implementations, the number and/or arrangement of segments 130 generated is based on input such as gesture input. For instance, in the illustrated example the video content 122 depicts a person with left and right hands raised. The segmentation module 116 detects this gesture, and accordingly generates the left segment 322 including the left hand, the center segment 324 containing the facial region of the person, and the right segment 326 depicting the person's right hand. Thus, a variety of different shapes, number, positions, and orientations of segments 130 are contemplated along with a variety of associated functionality.

Figure 4A:
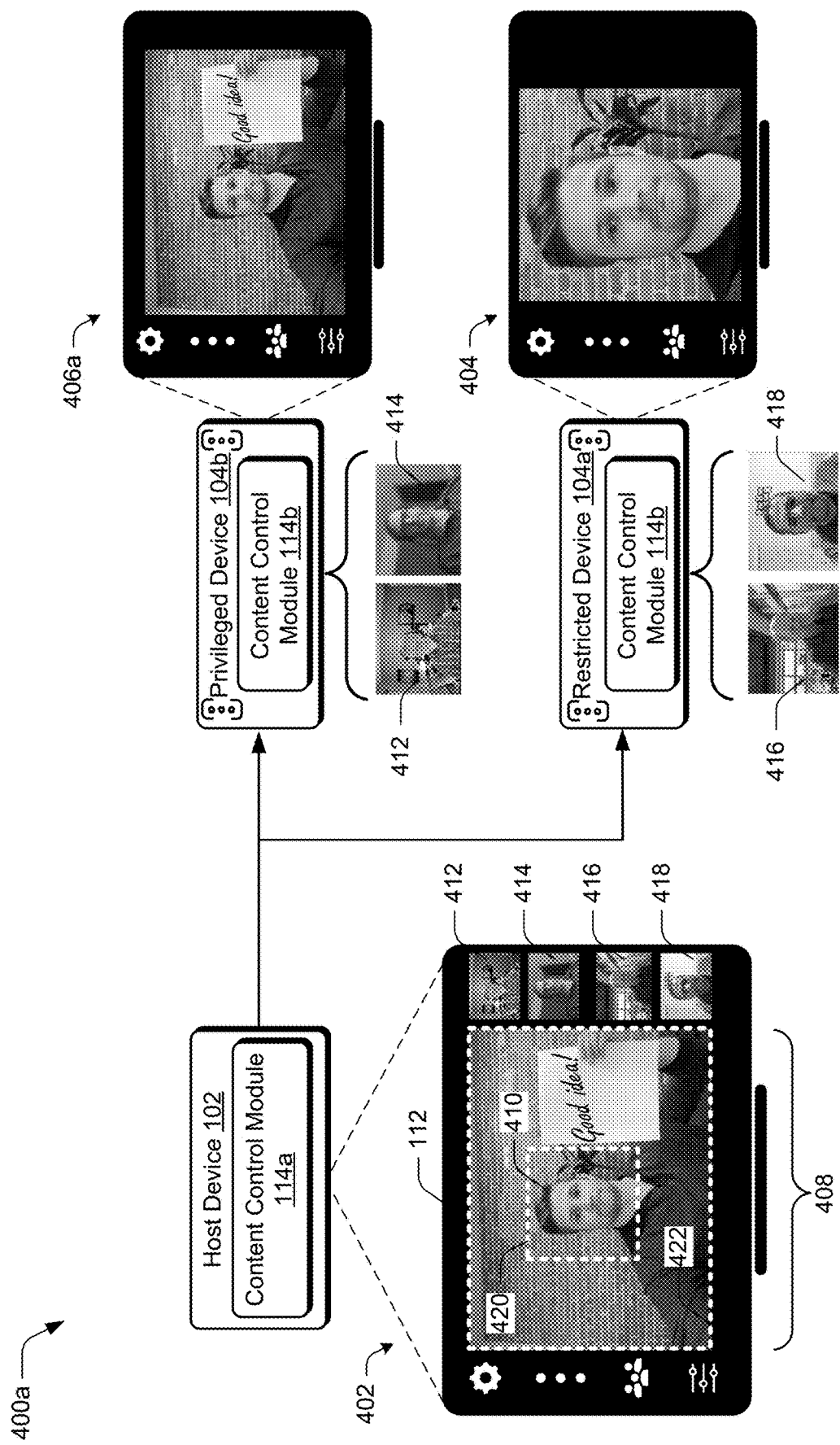
FIG. 4a depicts an example implementation for selective video conference segmentation in accordance with one or more implementations.

FIG. 4a depicts an example implementation 400a for selective video conference segmentation in accordance with one or more implementations. In this example, shown in first stage 402, second stage 404, and third stage 406a, the host device 102 and several participant devices 104 are communicatively coupled for a video conference call. In this example, the participant devices 104 include two restricted devices 104a and two privileged devices 104b. First stage 402 illustrates a scene 408 captured by video content 122 displayed by a video conference application via the user interface 112 of the host device 102. The display device 110 of the host device 102 includes a visual representation of the video content 122, as well as video content captured by the participant devices 104, e.g., as shown as video content 412, video content 414, video content 416, and video content 418.

In this example, the individual depicted at 410 is the host, e.g., a user of the host device 102. The individuals depicted in the video content 412, 414, 416, and 418 are representative of respective participant devices 104. In this particular example, the participant devices 104 represented by the video content 416, 418 are part of a first subset of participant devices 104, e.g., a restricted subset. The participant devices 104 represented by the video content 412, 414 are part of a second subset of participant devices 104, e.g., a privileged subset. In this example, the determination of the first subset of participant devices 104 and the second subset of participant devices 104 is based on a status of the participant devices. For instance, an organizational classifier indicates that the individuals represented by the video content 412, 414 and the individual depicted at 410 are members of the same organization, e.g., have matching organizational classifiers. The individuals represented by the video content 416, 418 have a dissimilar organizational classifier from the individual depicted at 410, i.e., are members of a different organization.

In accordance with the techniques described above, the content control module 114a is operable to generate one or more segments 130 representing different spatial regions of the video content 122 captured by the host device 102. In this example, the segments 130 are delineated by dashed white lines. A central segment 420 includes the face of the individual depicted at 410 and a peripheral segment 422 depicts the remainder of the scene 408, e.g., including the brick wall and the paper with the words "Good idea!" written on them. The content control module 114a generates a first video stream for communication to the first subset of participant devices 104, in this example restricted devices 104a, and a second video stream for communication to the second subset of participant devices, in this example privileged devices 104b.

As illustrated in second stage 404, the first video stream includes the central segment 420, i.e., the face of the individual at 410. Thus, the first video stream is a restricted video stream 206a displayed by the restricted devices 104a that depicts a limited field of view of the scene 408 captured by the video content 122. As illustrated in third stage 406a, the second video stream includes the central segment 420 as well as the peripheral segment 422. Thus, the second video stream is a privileged video stream 206b displayed by the privileged devices 104b that depicts the first video stream as well as additional content, i.e., an additional segment 422. Accordingly, the individuals represented by the video content at 412, 414 are able to view additional content, i.e., the "Good idea!" sign held up by the individual at 410.

Figure 4B:
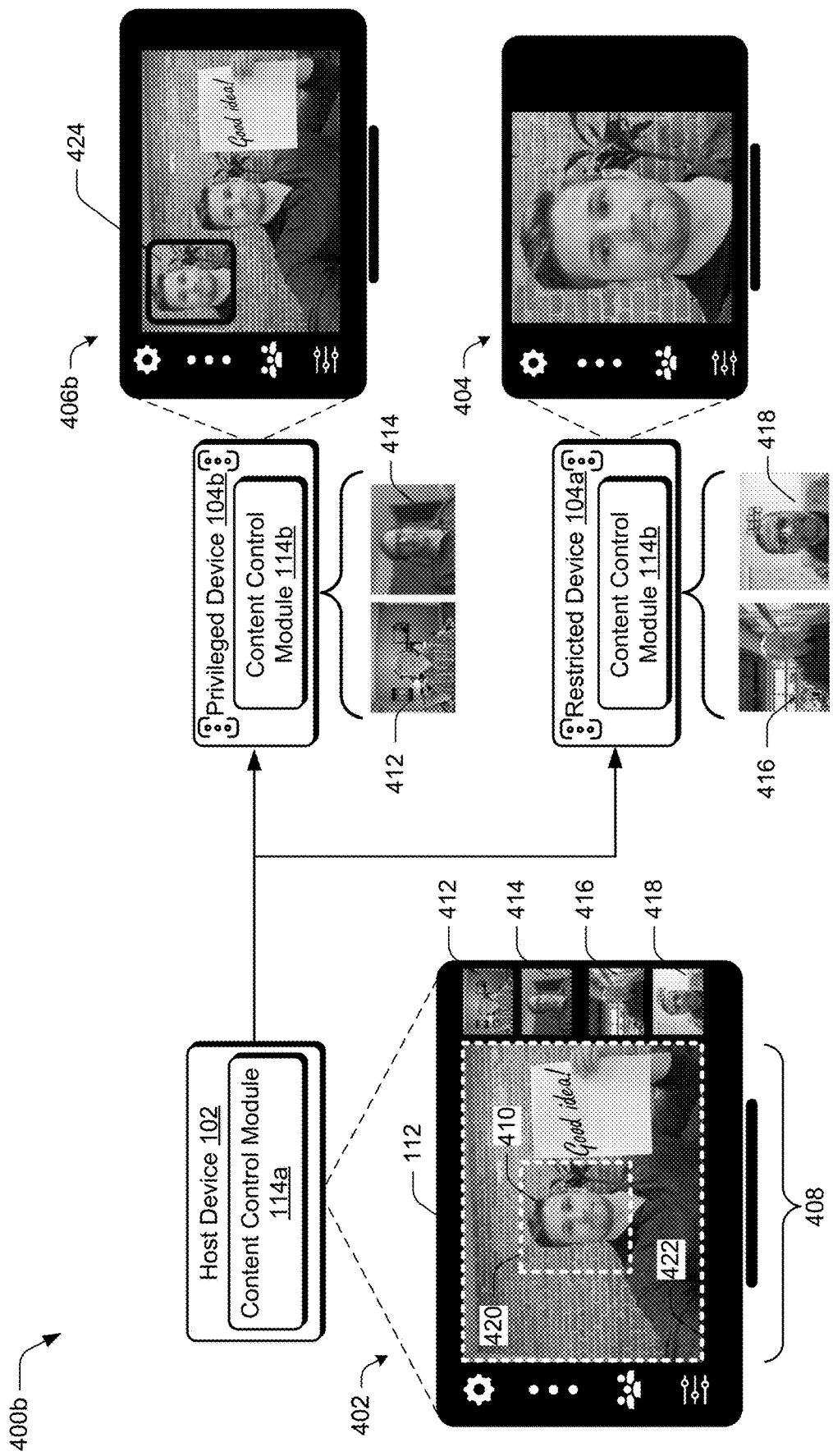
FIG. 4b depicts an example implementation for selective video conference segmentation in which the second video stream includes supplemental content in accordance with one or more implementations.

FIG. 4b depicts an example implementation 400b for selective video conference segmentation in which the second video stream includes supplemental content in accordance with one or more implementations. In this example, first stage 402 and second stage 404 are similar to that described with respect to FIG. 4a. In this example, however, as illustrated in third stage 406b, the privileged video stream 206b additionally includes a representation 424 of the restricted video stream 206a communicated to the second subset of participant devices 104. In this way, the individuals represented by the video content 412, 414 associated with privileged devices 104b can visualize the view provided to the restricted devices 104a.

FIG. 4c depicts an example implementation 400c for selective video conference segmentation in which the first video stream includes additional supplemental content in accordance with one or more implementations. In this example, first stage 402 and second stage 404 are similar to that described with respect to FIG. 4a. In this example, however, as illustrated in third stage 406c, the privileged video stream 206b additionally includes a representation 426 of the restricted video stream 206a communicated to the first subset of participant devices 104, i.e., the restricted devices 104a in the restricted subset. The representation 426 also depicts the restricted subset, e.g., the individuals represented by the video content 416, 418. The privileged video stream 206b also includes a representation 428 of the participant devices 104 included in the privileged subset, e.g., the individuals represented by the video content 412, 414. Thus, in this example the individuals represented by the video content 412, 414 are provided with a holistic representation of the informational distribution within the video conference. That is, the individuals in the privileged subset are able to view the scene 408 as well as what information is communicated to which of the other participants in the video conference.

Figure 5:
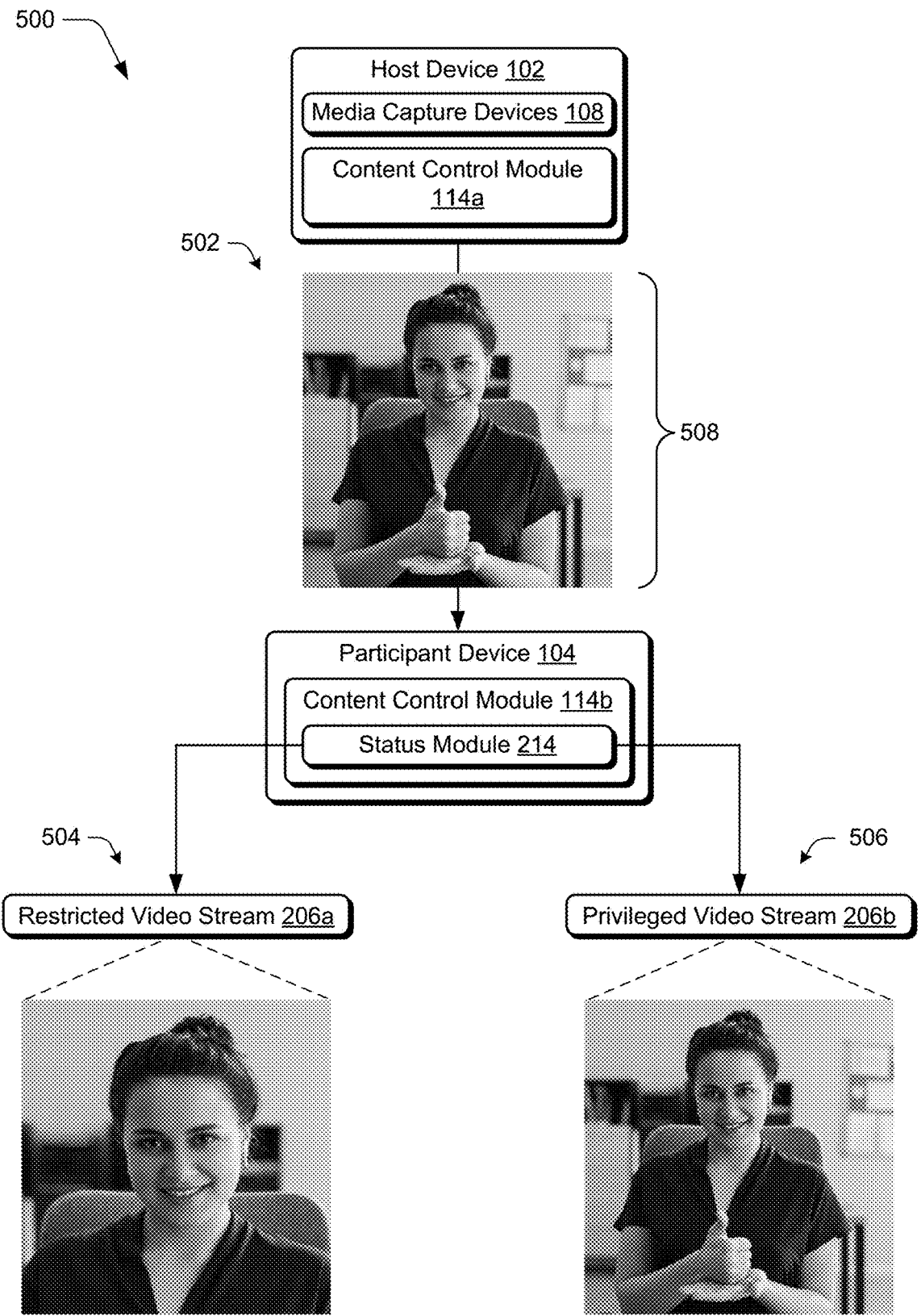
FIG. 5 depicts an example implementation for selective video conference segmentation illustrating operation of a content control module of a participant device in accordance with one or more implementations.

FIG. 5 depicts an example implementation 500 for selective video conference segmentation illustrating operation of a content control module of a participant device in accordance with one or more implementations. In this example, shown in first stage 502, second stage 504, and third stage 506, a host device 102 and a participant device 104 are communicatively coupled in a videoconference context, e.g., as described above. At first stage 502, media capture devices 108 of the host device 102 are employed to capture video content 122 depicting a scene 508. In this example, the individual depicted by the video content 122 is a teacher and is giving a lecture while also using sign language, e.g., forming the sign for "help." The participant device 104 is operable to receive the video content 122 as part of the video conference session. The status module 214 is employed to determine a status of the participant device 104, e.g., based on a permission setting configurable by the participant device 104, an organizational classifier, as defined by the host device 102, etc. In the illustrated example, the status of the participant device 104 is based on a determination whether a user of the participant device 104 has permission to view an expanded view of the scene 508.

Based on the determined status, the content control module 114b of the participant device 104 is operable to generate a video stream 206 for display by the participant device 104 by including one or more segments 130 in the video stream 206. For instance, second stage 504 depicts a scenario in which the participant device 104 is determined to be a restricted device 104a and does not have permission to view the full scene 508. Thus, the restricted video stream 206a includes a segment 130 depicting just the face of the teacher. Third stage 506 depicts an example in which the status module 214 determines the status of the participant device 104 as privileged, e.g., has permission to display an expanded view. Thus, the privileged video stream 206b includes a view of the full scene 508, and a user of the participant device 104 is able to view the teacher using sign language.

Figure 6:
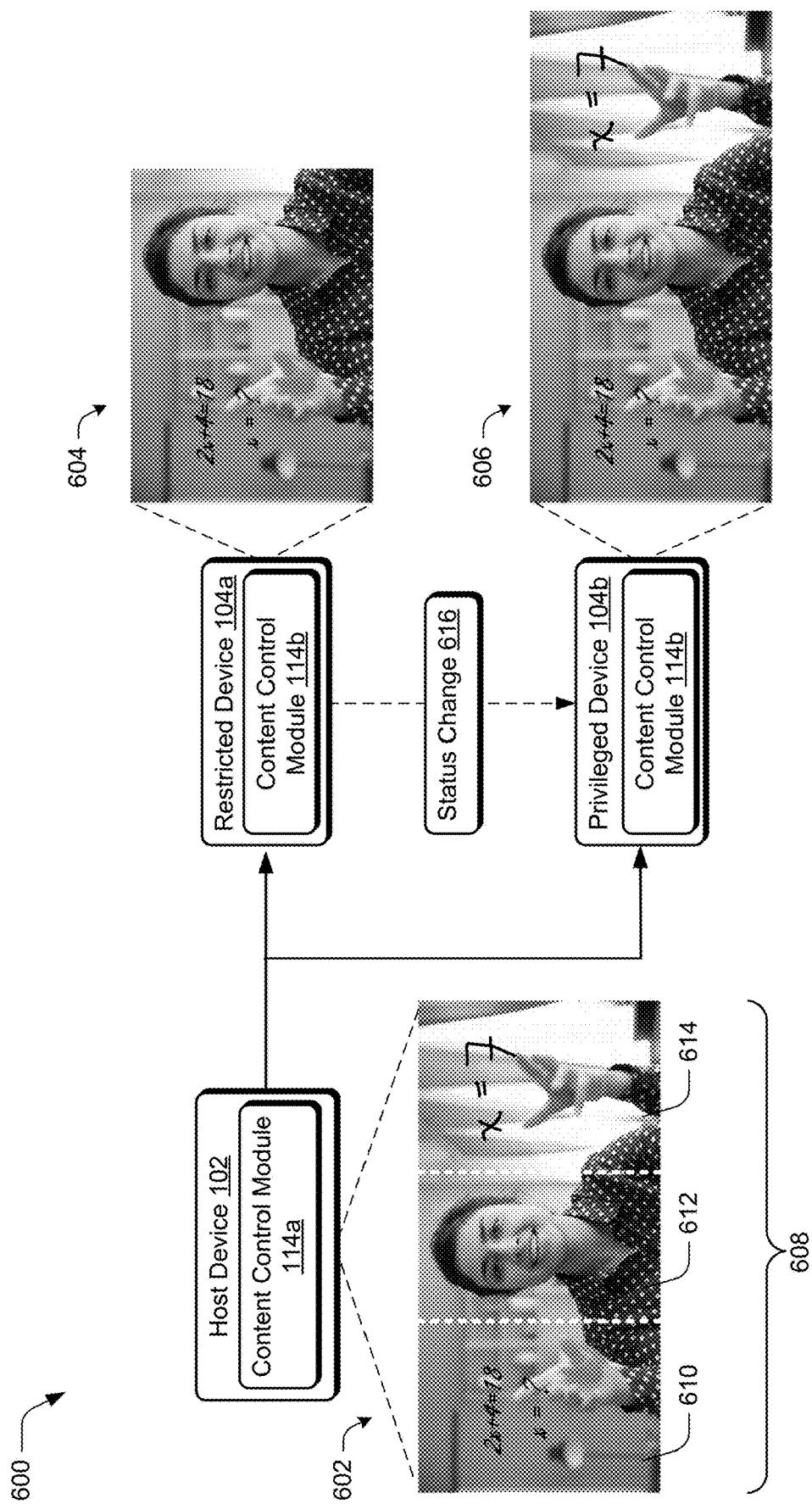
FIG. 6 depicts an example implementation for selective video conference segmentation depicting various functionality of segments in accordance with one or more implementations.

FIG. 6 depicts an example implementation 600 for selective video conference segmentation depicting various functionality of segments in accordance with one or more implementations. In this example, shown in first stage 602, second stage 604, and third stage 606, a host device 102 and one or more participant devices 104 are communicatively coupled in a videoconference context, e.g., as described above. At first stage 602, the host device 102 captures video content 122 depicting a scene 608. In this example, the individual depicted by the video content 122 is a teacher giving a mathematics lesson, and the participant devices 104 are associated with students.

The content control module 114a is operable to generate segments 130 from the video content 122, in this example a left segment 610, center segment 612, and right segment 614. The left segment 610 includes an equation provided by the teacher, e.g., as text overlayed on a portion of the scene 608. The center segment 612 depicts the teacher's face. The right segment 614 depicts the answer provided by the teacher, e.g., using a "whiteboard" functionality to draw on a portion of the scene 608. For instance, the content control module 114a leverages object tracking to determine a location of the teacher's hand relative to the scene 608. Based on the location, the content control module 114a generates a visual representation of a stroke overlaying the right segment 614, e.g., as defined by the teacher.

Second stage 604 depicts an example based on a determination that the participant device 104 is a restricted device 104a. Thus, a user of the restricted device 104a is able to view the left segment 610 and the center segment 612, but not the right segment 614 with the answer. Third stage 606 depicts an example in which the participant device 104 is determined to be a privileged device 104b. Thus, a user of the privileged device 104b is able to view the left segment 610, the center segment 612, and the right segment 614 with the answer.

In some examples, the status of the participant device 104 is changeable throughout the course of a video conference. In the illustrated example for instance, the participant device 104 can undergo a status change 616 from a restricted device 104a to a privileged device 104b based on an indication that a user of the participant device 104 has performed an action. In this example, the status change 616 is responsive to an indication that a participant device 104 has provided an answer to the question posed by the teacher. In other examples, the status change 616 is based on a trigger such as a user input on the host device 102, input on the participant device 104, automatically in response to a time limit expiration, etc. Thus, the techniques described herein enable dynamic and customizable information sharing modalities in a variety of contexts.

Figure 7:
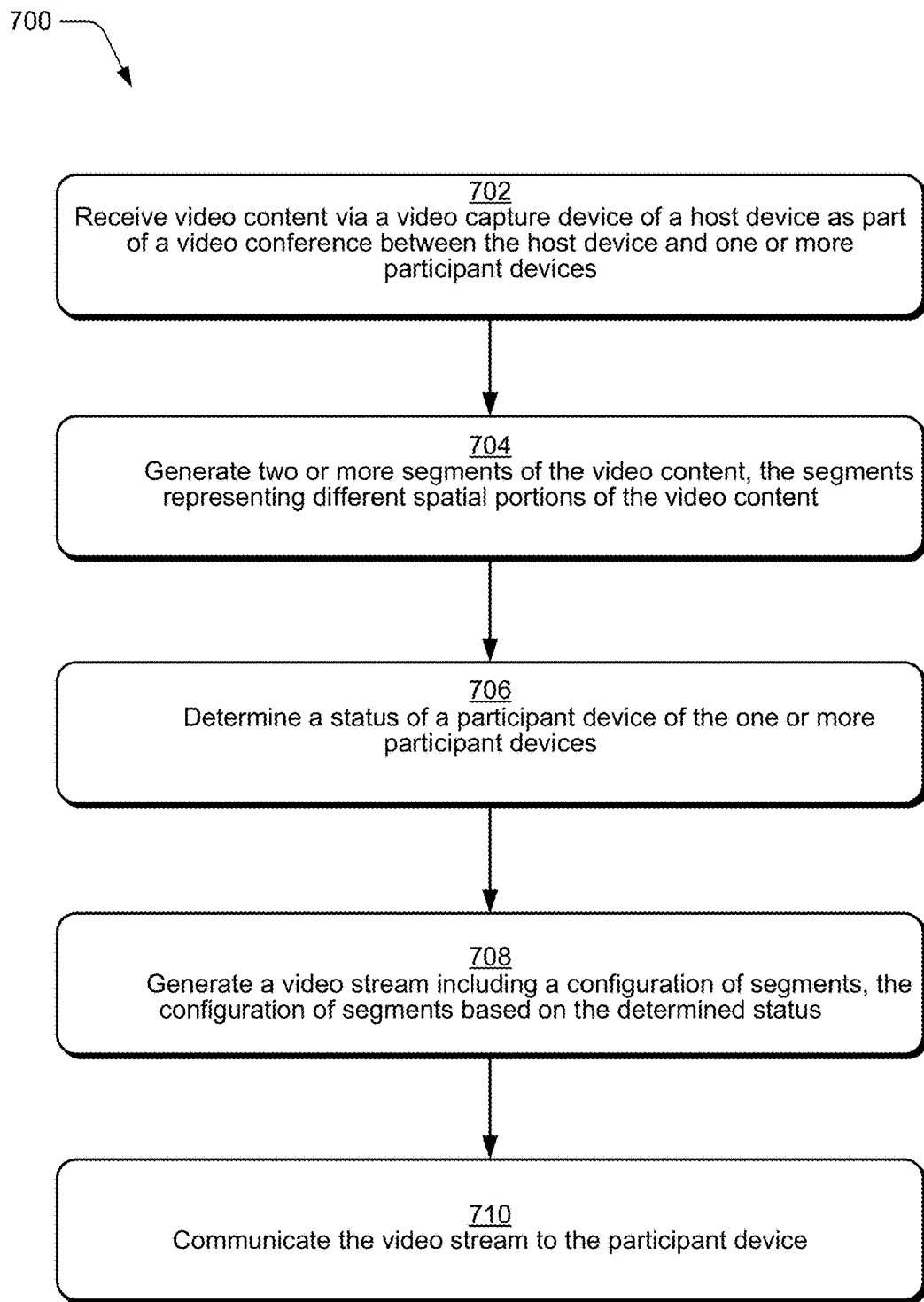
FIG. 7 illustrates a flow chart depicting an example method for selective video conference segmentation in accordance with one or more implementations.

FIG. 7 illustrates a flow chart depicting an example method 700 for selective video conference segmentation in accordance with one or more implementations. At 702, video content is received via a video capture device of a host device as part of a video conference between the host device and one or more participant devices. For instance, media capture devices 108 such as one or more cameras are operable to capture video content 122 from an environment surrounding the host device 102. At 704, two or more segments of the video content are generated such as segments 130 representing different spatial portions of the video content 122. In an example, the segmentation is responsive to detection of an input trigger. A variety of segments can be generated, e.g., of different number, shape, orientation, position, etc. Further, in some examples, the segments 130 include a variety of visual content or functionalities, for instance supplemental images or videos, screen shared content, text inputs, user gesture recognition, and/or touch-based drawings. By way of example, one or more of the segments 130 can include a visual representation of a stroke defined by a user of the host device 102 or the participant device 104, e.g., as drawn by a user using a hand or stylus as further described above.

At 706, a status of a participant device of the one or more participant devices is determined. The status indicates, for instance, the viewership permissions of a user of a respective participant device 104. The status may indicate that a user of a respective participant device 104 is a restricted participant or a privileged participant based on an organizational classifier of a user associated with the participant device. In various examples, one or more of the generation of the segments 130, the generation of the video stream 206, the configuration of the segments 130 in the video stream 206, or the communication of the video stream 206 to the participant device 104 are based on the determined status. In some examples, the status of the participant device 104 is changeable throughout the course of the video conference.

At 708, a video stream is generated including a configuration of segments based on the determined status. For instance, the status of the participant device 104 corresponds to a number or position of segments 130 included in the configuration of segments 130. In an example, the status of the participant device 104 is restricted and thus the video stream module 120 prohibits inclusion of one or more of the segments 130 as part of the video stream 206. In another example, the status of the participant device is privileged, and the video stream includes at least two of the segments 130. At 710, the video stream is communicated to the participant device. The video stream 206, for instance, is communicated for display in a user interface 128 of the participant device 104. Thus, the method 700 enables communication of various content included in a video stream to a participant device 104 based on a status of the participant device 104.

Figure 8:
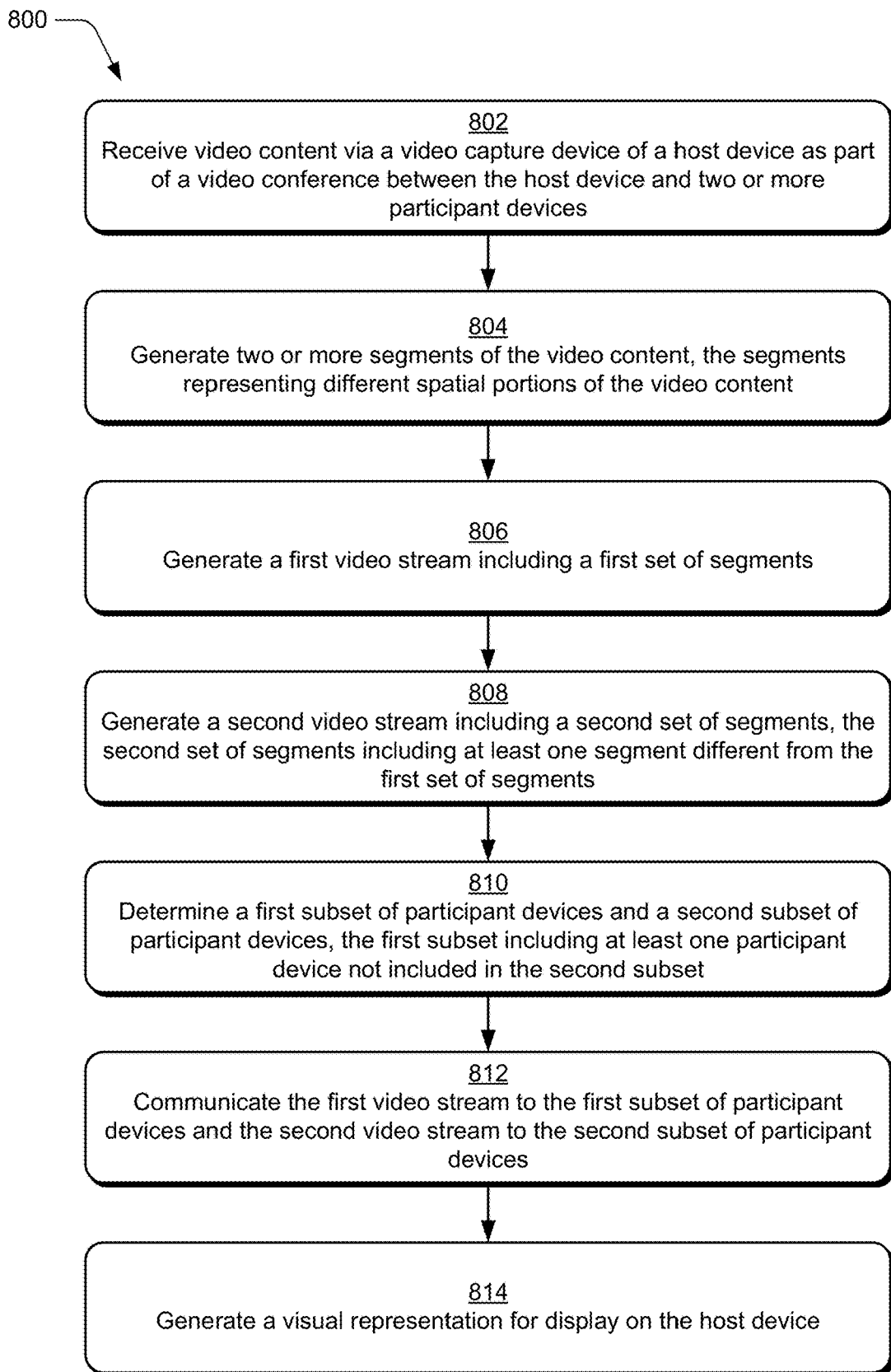
FIG. 8 illustrates a flow chart depicting an example method for selective video conference segmentation in accordance with one or more implementations.

FIG. 8 illustrates a flow chart depicting an example method 800 for selective video conference segmentation in accordance with one or more implementations. At 802, video content is received via a video capture device of a host device as part of a video conference between the host device and two or more participant devices. For instance, media capture devices 108 such as one or more cameras are operable to capture video content 122 from an environment surrounding the host device 102. At 804, two or more segments of the video content are generated. The segments, for instance, represent different spatial portions of the video content. As described above, a variety of segments 130 can be generated, e.g., segments of a different number, shape, orientation, position, etc. In some examples, the generation of the segments 130 is responsive to detection of an input trigger, e.g., a touch actuation, a user gesture, and/or indication from AI-driven scene detection. In one or more examples, facial recognition is used to generate the segments 130. In various examples, one or more segments 130 support functional features such as user gesture recognition, touch-based drawing, and/or object-tracked representations such as a "whiteboard" feature, etc. For instance, the content control module 114a can detect user gestures in one or more of the segments 130 to control a variety of functionality such as to change visual effects of the video stream 206 such as zoom, focus, blur, background settings, etc.

At 806, a first video stream is generated including a first set of segments. As described above, the segments 130 in the video stream 206 can be configured in a variety of ways and based on number of factors, e.g., status, resource consumption, video optimization, etc. In one example, the first video stream is a restricted video stream 206a that depicts a limited field of view of a scene captured by the video content 122. At 808, a second video stream including a second set of segments is generated. The second set of segments includes at least one segment 130 different from the first set of segments. For instance, the second set of segments includes at least one segment 130 that is not included in the first set of segments. In an example, the second video stream is a privileged video stream 206b that depicts the first video stream and at least one additional segment 130 not included in the first video stream. In another example, the second video stream further includes one or more of a representation of the participant devices 104 included in the first subset, a representation of the participant devices 104 included in the second subset, and/or a representation of the first video stream.

At 810, a first subset of participant devices and a second subset of participant devices are determined. In an example, the first subset includes at least one participant device not included in the second subset. Various combinations of subsets are contemplated, and participant devices 104 of a video conference setting can be grouped into subsets in any such suitable way. In some implementations, there are more than two subsets, e.g., based on a status level, organizational classifier, etc. At 812, the first video stream is communicated to the first subset of participant devices and the second video stream is communicated to the second subset of participant devices. Thus, the first video stream is displayable by the first subset of participant devices 104 and the second video stream is displayable by the second subset of participant devices 104. At 814, a visual representation is generated for display on the host device. In various examples, the visual representation includes one or more of the video content 122, a representation of the participant devices 104 included in the first subset, a representation of the participant devices 104 included in the second subset, the first video stream, and/or the second video stream. Thus, the example method 800 enables a host device 102 to provide variable communication to different participants within a video conference and provide a variety of display configurations to improve accessibility within a video conference.

Figure 9:
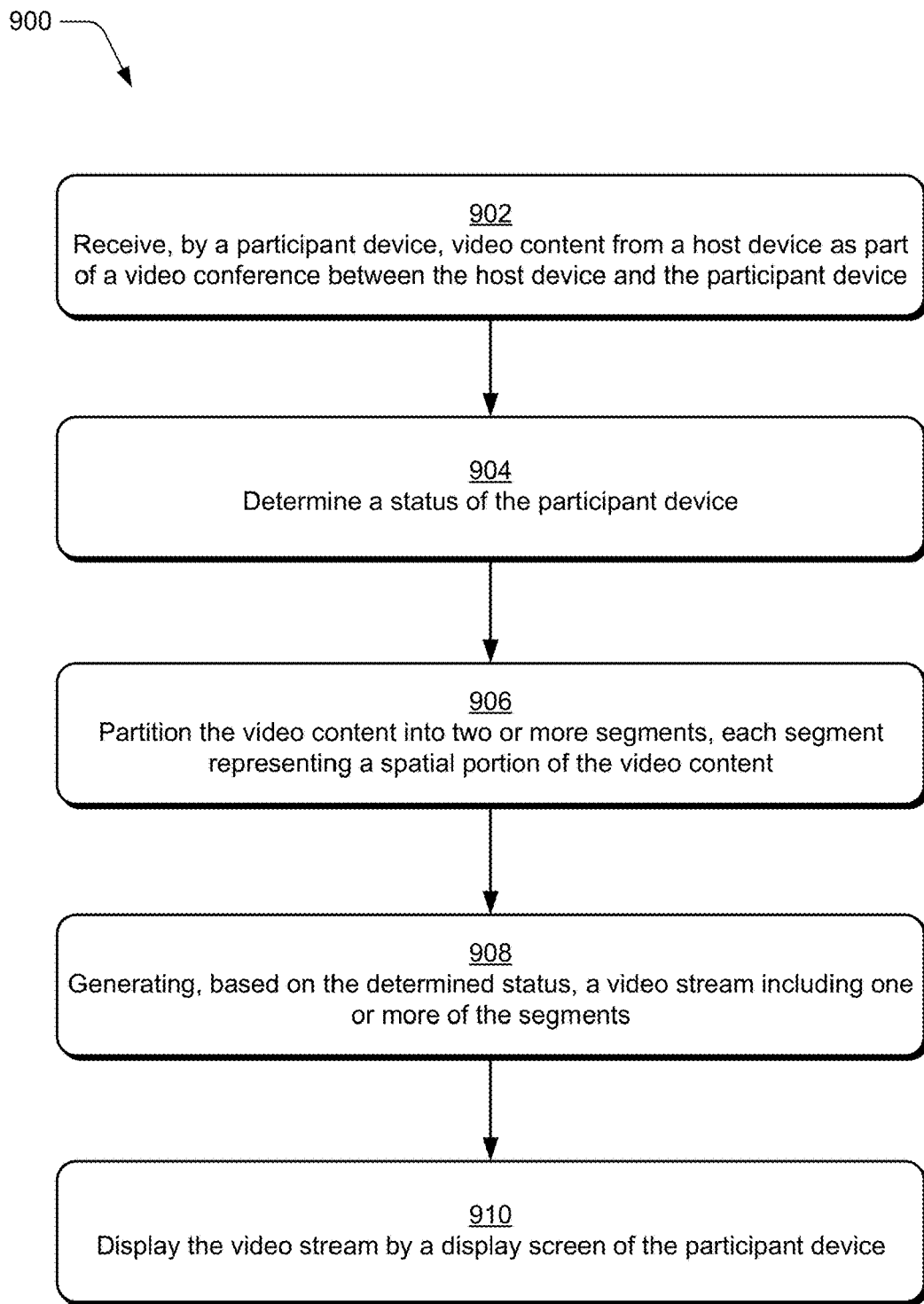
FIG. 9 illustrates a flow chart depicting an example method for selective video conference segmentation in accordance with one or more implementations.

FIG. 9 illustrates a flow chart depicting an example method 900 for selective video conference segmentation in accordance with one or more implementations. At 902, a participant device receives video content from a host device as part of a video conference between the host device and the participant device. For instance, the video content is received as video content 122 that has not been segmented by the host device 102. In additional or alternative implementations, the video content is received as video content 122 that is pre-segmented, e.g., the video content 122 includes segments 130 generated by a segmentation module 116 of the host device 102. At 904, a status of the participant device is determined. The status indicates, for instance, a viewership permission for the participant device 104. In an example, the status of the participant device 104 corresponds to a number and/or position of segments 130 including in the configuration of segments 130. The status can be based on a permission setting, an organizational classifier, user defined, etc. In some implementations, the determination of the status of the participant device 104 includes a determination whether a participant is a restricted participant or a privileged participant. In other examples, there are a variety of status levels that correspond to different viewership rights for the participant device 104, e.g., a first tier, second tier, third tier, etc. In one or more implementations, the participant device 104 is operable to determine the status of additional participant devices included in the video conference session. The status of the participant device 104 is also changeable during the video conference session, e.g., from restricted to privileged.

At 906, the video content is partitioned into two or more segments. Thus, two or more segments 130 are generated from the video content 122. The segments 130 represent spatial portions of the video content 122. As described above, there are a variety of ways that video content 122 can be partitioned, e.g., using facial recognition and/or object recognition techniques to determine a region of interest. In an example, this includes performing facial detection and/or object detection operations on the video content 122 in real time, e.g., as it is received from the host device 102. In one or more implementations, generation of the segments 130 is based on the status of the participant device 104. In some examples, the segments 130 include a variety of visual content and/or functionalities, for instance supplemental images and/or videos, screen shared content, text inputs, user gestures, and/or touch-based drawings. By way of example, one or more of the segments 130 can include a visual representation of a stroke defined by a user of the host device 102 or the participant device 104. In further examples, the partitioning is responsive to detection of an input trigger, such as a touch actuation, a user gesture, or features identified using artificial intelligence driven scene detection. In some implementations, the video content 122 received by the participant device 104 includes segments 130 generated by the host device 102 and the participant device 104 is operable to further partition the video content 122 and/or these segments 130.

At 908, a video stream is generated based on the determined status. For instance, the status of the participant device 104 is unrestricted (e.g., privileged) and the video stream 206 includes two or more segments 130. In an example, this is based on a determination that an organizational classifier of a user of the participant device 104 matches an organizational classifier of a user of the host device 102. The video stream 206 is further configurable to include additional information, such as an indication of the status of an additional participant device 104 included in the video conference and a representation of an additional video stream displayed by the additional participant device 104.

In another example the status of the participant device 104 is restricted, for instance based on a determination that an organizational classifier of a user of the participant device 104 is dissimilar from an organizational classifier of a user of the host device 102. The participant device 104 restricts inclusion of one or more of the segments 130 in the video stream 206, and thus prohibits display of such segments 130 on a display device 126 of the participant device 104. In some examples, the prohibited segment is one that is determined to be outside of a region of interest, e.g., as determined using object recognition techniques. In implementations in which the video content 122 received by the participant device 104 includes segments 130 generated by the host device 102, the participant device 104 is operable to include one or more of these segments 130 in the video stream 206. At 910, the video stream is displayed by a display device of the participant device. In an example, the video stream 206 is displayed in a user interface 128 of the display device 126. In this way, the participant device 104 is operable to selectively control visual content displayed in the user interface 128.

The example methods recited and/or described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
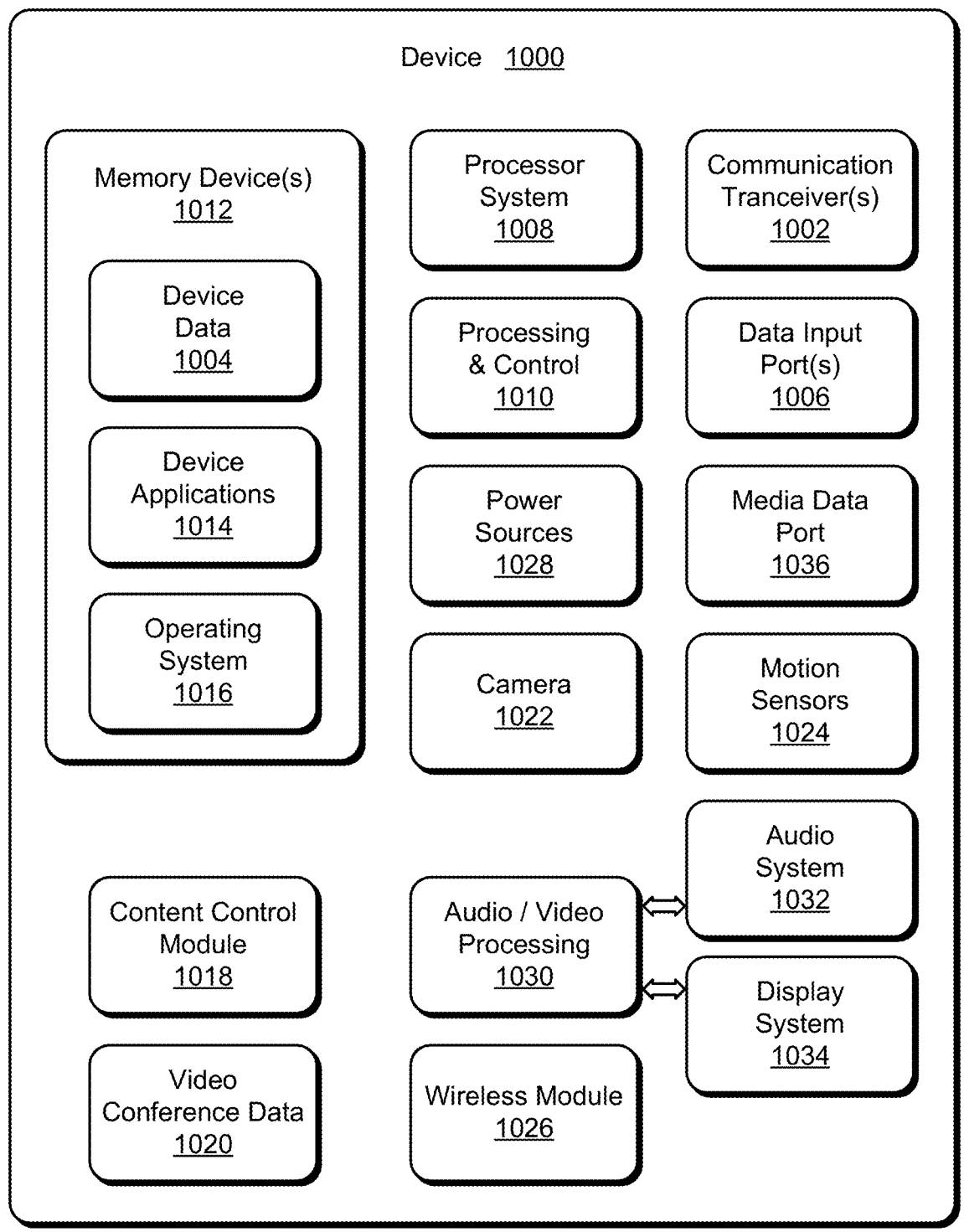
FIG. 10 illustrates various components of an example device in which aspects of selective video conference segmentation can be implemented.

FIG. 10 illustrates various components of an example device 1000 in which aspects of selective video conference segmentation can be implemented. The example device 1000 can be implemented as any of the devices described with reference to the previous FIGS. 1-9, such as any type of mobile device, mobile phone, mobile device, wearable device, tablet, computing, communication, entertainment, gaming, media playback, and/or other type of electronic device. For example, the host device 102 and/or the participant devices 104 as shown and described with reference to FIGS. 1-9 may be implemented as the example device 1000. In a wearable device implementation, the device may include any one or combination of a watch, armband, wristband, bracelet, glove or pair of gloves, glasses, jewelry items, clothing items, any type of footwear or headwear, and/or other types of wearables.

The device 1000 includes communication transceivers 1002 that enable wired and/or wireless communication of device data 1004 with other devices. The device data 1004 can include any of device identifying data, device location data, wireless connectivity data, and wireless protocol data. Additionally, the device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes a content control module 1018 that implements aspects of selective video conference segmentation and may be implemented with hardware components and/or in software as one of the device applications 1014. In an example, the content control module 1018 can be implemented as the content control module 114a, 114b described in detail above. In implementations, the content control module 1018 may include independent processing, memory, and logic components as a computing and/or electronic device integrated with the device 1000. The device 1000 also includes video conference data 1020 for implementing aspects of selective video conference segmentation and may include data from and/or utilized by the content control module 1018, examples of which are described above.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the host device 102 and/or the participant devices 104, the wireless module 1026 can be leveraged to scan for and detect wireless networks, as well as negotiate wireless connectivity to wireless networks for the host device 102 and/or the participant devices 104. The device 1000 can also include one or more power sources 1028, such as when the device is implemented as a mobile device. The power sources 1028 may include a charging and/or power system, and can be implemented as a flexible strip battery, a rechargeable battery, a charged super-capacitor, and/or any other type of active or passive power source.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of selective video conference segmentation have been described in language specific to features and/or methods, the subject of the appended claims is not necessarily limited to the specific features or methods described. Rather, the features and methods are disclosed as example implementations of selective video conference segmentation, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to a computing device, including: a display device to display a user interface of a video conference session between the computing device and a host device; and a content control module implemented at least partially in hardware and configured to: receive video content from the host device as part of the video conference session; determine a status of the computing device; and generate, based on the determined status, a video stream for display by the computing device by including one or more segments representing one or more different spatial portions of the video content in the video stream.

In some aspects, the techniques described herein relate to a computing device, wherein the status is determined to be a restricted status, and wherein to generate the video stream, the content control module is configured to prohibit display of one or more segments as part of the video stream.

In some aspects, the techniques described herein relate to a computing device, wherein the status is determined to be a privileged status, and wherein to generate the video stream, the content control module is configured to include two or more segments as part of the video stream.

In some aspects, the techniques described herein relate to a computing device, wherein the content control module is further configured to generate the one or more segments in response to detection of an input trigger, the input trigger including one or more of a touch actuation, a user gesture, or a feature detected using artificial intelligence driven scene detection.

In some aspects, the techniques described herein relate to a computing device, wherein the video content includes segments generated by the host device, and wherein to generate the video stream the content control module is configured to include one or more of the segments generated by the host device.

In some aspects, the techniques described herein relate to a computing device, wherein the status of the computing device is changeable during the video conference session.

In some aspects, the techniques described herein relate to a computing device, wherein the one or more segments include a region of interest detected using object recognition techniques.

In some aspects, the techniques described herein relate to a computing device, wherein the one or more segments are generated using facial recognition.

In some aspects, the techniques described herein relate to a computing device, wherein the content control module determines an additional status of an additional participant device included in the video conference session.

In some aspects, the techniques described herein relate to a method, including: receiving, by a participant device, video content from a host device as part of a video conference between the host device and the participant device; determining a status of the participant device; partitioning the video content into two or more segments, the segments representing spatial portions of the video content; generating, based on the determined status, a privileged video stream including two or more of the segments; and displaying the privileged video stream by a display device of the participant device.

In some aspects, the techniques described herein relate to a method, wherein the privileged video stream includes an indication of the status of an additional participant device included in the video conference and a representation of an additional video stream displayed by the additional participant device.

In some aspects, the techniques described herein relate to a method, wherein the status is based on a first organizational classifier of a user of the participant device matching a second organizational classifier of a user of the host device.

In some aspects, the techniques described herein relate to a method, wherein one or more of the segments includes a visual representation of a stroke defined by a user of the host device.

In some aspects, the techniques described herein relate to a method, wherein the partitioning is responsive to detection of an input trigger, the input trigger including one or more of a touch actuation, a user gesture, or features identified using artificial intelligence driven scene detection.

In some aspects, the techniques described herein relate to a method, wherein one or more of the segments are generated using facial recognition.

In some aspects, the techniques described herein relate to a method, wherein one or more of the segments include a region of interest detected using object recognition techniques.

In some aspects, the techniques described herein relate to a method, including: receiving, by a participant device, video content from a host device as part of a video conference between the host device and the participant device; determining a status of the participant device as restricted; partitioning the video content into two or more segments, the segments representing spatial portions of the video content; generating, based on the determined status as restricted, a restricted video stream by prohibiting display of one or more of the segments on the participant device; and displaying the restricted video stream by a display device of the participant device.

In some aspects, the techniques described herein relate to a method, wherein one or more of the segments are generated using facial recognition.

In some aspects, the techniques described herein relate to a method, wherein generating the restricted video stream includes prohibiting the display of segments that are determined to be outside of a region of interest using object recognition techniques.

In some aspects, the techniques described herein relate to a method, wherein the status is based on a first organizational classifier of a user of the participant device being dissimilar from a second organizational classifier from a user of the host device.

The invention claimed is:

1. A computing device, comprising:
a display device to display a user interface of a video conference session between the computing device and a host device; and
a content control module implemented at least partially in hardware and configured to:
receive video content from the host device as part of the video conference session;
segment the video content into two or more spatial segments that represent different spatial regions of the video content;
determine a status of the computing device; and
generate a video stream for display by the computing device by including one or more of the spatial segments in the video stream, a number and configuration of the spatial segments included in the video stream based on the determined status.

2. The computing device as recited in claim 1, wherein the status is determined to be a restricted status, and wherein to generate the video stream, the content control module is configured to prohibit display of one or more of the spatial segments as part of the video stream.

3. The computing device as recited in claim 1, wherein the status is determined to be a privileged status, and wherein to generate the video stream, the content control module is configured to include two or more of the spatial segments as part of the video stream.

4. The computing device as recited in claim 1, wherein the content control module is further configured to generate the two or more spatial segments in response to detection of an input trigger, the input trigger including one or more of a touch actuation, a user gesture, or a feature detected using artificial intelligence driven scene detection.

5. The computing device as recited in claim 1, wherein the video content includes spatial segments generated by the host device, and wherein to generate the video stream the content control module is configured to include one or more of the spatial segments generated by the host device.

6. The computing device as recited in claim 1, wherein the status of the computing device is changeable during the video conference session.

7. The computing device as recited in claim 1, wherein one or more of the spatial segments includes a region of interest detected using object recognition techniques.

8. The computing device as recited in claim 1, wherein one or more of the spatial segments are generated using facial recognition.

9. The computing device as recited in claim 1, wherein the content control module determines an additional status of an additional participant device included in the video conference session.

10. A method, comprising:
- receiving, by a participant device, video content from a host device as part of a video conference between the host device and the participant device;
- determining a status of the participant device as privileged;
- segmenting the video content to generate two or more spatial segments that represent different spatial regions of the video content;
- generating a privileged video stream including two or more of the spatial segments, a number and configuration of the spatial segments included in the privileged video stream based on the determined status as privileged; and
- displaying the privileged video stream by a display device of the participant device.

11. The method as described in claim 10, wherein the privileged video stream includes an indication of the status of an additional participant device included in the video conference and a representation of an additional video stream displayed by the additional participant device.

12. The method as described in claim 10, wherein the status is based on a first organizational classifier of a user of the participant device matching a second organizational classifier of a user of the host device.

13. The method as described in claim 10, wherein one or more of the spatial segments includes a visual representation of a stroke defined by a user of the host device.

14. The method as described in claim 10, wherein the segmenting is responsive to detection of an input trigger, the input trigger including one or more of a touch actuation, a user gesture, or features identified using artificial intelligence driven scene detection.

15. The method as described in claim 10, wherein one or more of the spatial segments are generated using facial recognition.

16. The method as recited in claim 10, wherein one or more of the spatial segments includes a region of interest detected using object recognition techniques.

17. A method, comprising:
- receiving, by a participant device, video content from a host device as part of a video conference between the host device and the participant device;
- determining a status of the participant device as restricted;
- segmenting the video content into two or more spatial segments that represent different spatial regions of the video content;
- generating a restricted video stream by prohibiting display of one or more of the spatial segments on the participant device, a number of spatial segments that are prohibited from display is based on the determined status as restricted; and
- displaying the restricted video stream by a display device of the participant device.

18. The method as described in claim 17, wherein one or more of the spatial segments are generated using facial recognition.

19. The method as described in claim 17, wherein generating the restricted video stream includes prohibiting the display of spatial segments that are determined to be outside of a region of interest using object recognition techniques.

20. The method as described in claim 17, wherein the status is based on a first organizational classifier of a user of the participant device being dissimilar from a second organizational classifier from a user of the host device.

\* \* \* \* \*